(12) United States Patent
Villatoro Bernardo et al.

(10) Patent No.: US 11,977,254 B2
(45) Date of Patent: May 7, 2024

(54) COMPOSED MULTICORE OPTICAL FIBER DEVICE

(71) Applicant: UNIVERSIDAD DEL PAIS VASCO—EUSKAL HERRIKO UNIBERTSITATEA (UPV/EHU), Leioa (ES)

(72) Inventors: Agustín Joel Villatoro Bernardo, Leioa (ES); Joseba Andoni Zubia Zaballa, Leioa (ES)

(73) Assignee: UNIVERSIDAD DEL PAIS VASCO—EUSKAL HERRIKO UNIBERTSITATEA (UPV/EHU), Leioa (ES)

( * ) Notice: Subject to any disclaimer, the term of this patent is extended or adjusted under 35 U.S.C. 154(b) by 317 days.

(21) Appl. No.: 17/620,187

(22) PCT Filed: Jun. 24, 2020

(86) PCT No.: PCT/EP2020/067677
§ 371 (c)(1),
(2) Date: Dec. 17, 2021

(87) PCT Pub. No.: WO2020/260381
PCT Pub. Date: Dec. 30, 2020

(65) Prior Publication Data
US 2022/0342145 A1    Oct. 27, 2022

(30) Foreign Application Priority Data
Jun. 25, 2019   (EP) ..................... 19382535

(51) Int. Cl.
G02B 6/02 (2006.01)
G01B 11/16 (2006.01)
G01D 5/353 (2006.01)

(52) U.S. Cl.
CPC ........ G02B 6/02042 (2013.01); G01B 11/161 (2013.01); G01D 5/35306 (2013.01)

(58) Field of Classification Search
CPC .............. G02B 6/02042; G01B 11/161; G01D 5/35306; G01D 5/35332
See application file for complete search history.

(56) References Cited

U.S. PATENT DOCUMENTS 9,810,557 B2   11/2017   Amezcua-Correa et al.
10,620,372 B2*  4/2020   Matsui ................. G01B 11/27
2019/0113682 A1*  4/2019   Sakuma .................. G02B 6/24

FOREIGN PATENT DOCUMENTS

CN   103439765 A   12/2013
EP   1939659 A1    7/2008

OTHER PUBLICATIONS

David Barrera et al., "Low-loss photonic crystal fiber interferometers for sensor networks," Journal of Lightwave Technology, 2010, vol. 28, No. 24, pp. 3542-3547.
(Continued)

Primary Examiner — John Bedtelyon
(74) Attorney, Agent, or Firm — CANTOR COLBURN LLP

(57) ABSTRACT

A composed multicore optical fiber (MCF) device includes a first segment (MCF1) of a MCF having three coupled identical cores and having a first length (L1) and a second segment (MCF2) of the same MCF having a second length (L2). L1 and L2 are different from each other. One of the three coupled cores is located in a geometrical centre of the MCF. The first segment (MCF1) and the second segment (MCF2) of the MCF are rotated 180° relative to each other and spliced together. The first segment (MCF1) is spliced to a first segment (SMF1) of a single mode fiber (SMF) and the second segment (MCF2) is spliced to a second segment (SMF2) of the SMF. The free end of the second segment
(Continued)

(SMF2) of the SMF is coupled to a mirror (M) to reflect an optical signal coming from the first segment (SMF1) of the SMF.

15 Claims, 6 Drawing Sheets

(56) References Cited

OTHER PUBLICATIONS

Hao Liao et al., "Sensitivity amplification of fiber-optic in-line Mach-Zehnder interferometer sensors with modified Vernier-effect," Optics Express, Oct. 30, 2017, vol. 25, No. 22, 26898-26909.

Huihui Zhu et al., "Ultra-high sensitivity optical sensors based on cascaded two Fabry-Perot interferometers," Sensors and Actuators B: Chemical, 2018, vol. 277, pp. 152-156.

International Search Report dated Oct. 8, 2020 re: Application No. PCT/EP2020/067677, pp. 1-4, citing: J. Villatoro et al. "Twin Multicore Fiber . . . ", J. Villatoro et al. "Ultrasensitive vibration . . . ", US. 2019/0113682 A1 and CN 103 439 765 A.

J. Villatoro et al., "Ultrasensitive vibration sensor based on an asymmetric multi-core optical fiber", 26th International Conference on Optical Fiber Sensors, Sep. 27, 2018, p. ThE68, XP055647362.

J. Villatoro et al. "Twin Multicore Fiber Interferometers for Precision Sensing", 2019 Conference on Lasers and Electro-Optics Europe & European Quantum Electronics Conference (Cleo/Europe-EQEC), IEEE, Jun. 23, 2019, p. 1, XP033632883.

Written Opinion dated Oct. 8, 2020 re: Application No. PCT/EP2020/067677, pp. 1-6, citing: J. Villatoro et al. "Twin Multicore Fiber . . . ", J. Villatoro et al. "Ultrasensitive vibration . . . ", US. 2019/0113682 A1 and CN 103 439 765 A.

\* cited by examiner

COMPOSED MULTICORE OPTICAL FIBER DEVICE

TECHNICAL FIELD

In general, the present disclosure relates to optical fiber devices, and more particularly, to a composed device, e.g., a composed optical fiber interferometer or a composed optical fiber coupler, among other devices, that includes two segments of multicore optical fiber of different lengths which are fusion spliced but rotated with respect to each other. The device is intended for different applications including direction-sensitive curvature sensing, mechanical vibration sensing, or for measuring any other parameter that can introduce a change in the reflected pattern, for example, a reflected interference pattern.

BACKGROUND

Optical fiber interferometers and couplers are devices widely used as highly sensitive sensors. For example, interferometers have been used in optics for ultralight-resolution metrology or light modulation, among other applications.

Optical fibers, either conventional telecommunications fibers or specialty fibers, offer different alternatives to construct interferometers and couplers. For example, a short segment of photonic crystal fiber or MultiCore Fiber (MCF) can be fusion spliced between single mode optical fibers (see for example EP 1939659 B1, U.S. Pat. No. 9,810,557 B2). Such interferometers can be used as sensors for physical parameters such as strain, temperature, vibrations, bending, among others.

Most optical fiber interferometers are used as point sensors. Several individual interferometers can be placed in series (see D. Barrera et al., "Low-loss photonic crystal fiber interferometers for sensor networks," Journal of Lightwave Technology, Vol. 28, pp. 3542-3547, 2010, or U.S. Pat. No. 9,810,557 B2). In these cases, the phase or amplitude of each individual interferometer is decoded.

Two interferometers with short and slightly different periods can be placed in series (see H. Liao et al., "Sensitivity amplification of fiber-optic in-line Mach-Zehnder interferometer sensors with modified Vernier-effect," Opt. Express 25, 26898-26909, 2017). In this case, one interferometer is used as a reference and the other interferometer as a sensor. The sensitivity of two cascaded interferometers with the features aforementioned is increased, up to one order of magnitude, as compared to the sensitivity of a single interferometer. However, long segments of optical fibers are necessary to achieve short periods and high precision fabrication methods are necessary to achieve the desired difference between the periods of the reference and the sensing interferometer. Another disadvantage of two cascaded interferometers is the complexity of the output pattern (see H. Zhu et al., "Ultra-high sensitivity optical sensors based on cascaded two Fabry-Perot," Sensors and Actuators B: Chemical, Vol. 277, pp. 152-156, 2018) which is not easy to analyze. In addition, the parameter being sensed is codified in a relative parameter, e.g., the shift of the envelop of the superposition of two interference spectra.

The measuring range of two cascaded interferometers is narrower than that of a single interferometer (see A. D. Gomes et al., "Multimode Fabry-Perot interferometer probe based on Vernier effect for enhanced temperature sensing," Sensors, 19, art. 453, 2019).

The mentioned issues associated to the cascaded interferometers limit their applications to specific situations only.

SUMMARY

The present disclosure is intended to overcome the aforementioned problems of cascaded optical fiber interferometers by using MCFs with three coupled cores spliced between two segments of single mode optical fiber (SMF). The fundamental mode transmitted through the SMF provokes the excitation of several modes in the MCFs, more particularly several supermodes, which in turn produces a periodic modulation of the spectral response of the device due to supermode interference or coupling in the MCFs. As generally used herein, supermodes may refer to modes that are supported by MCF in which the cores are close enough that the guided light can couple by evanescent interaction between the cores.

Changes in some physical parameters of interest of an external environment in which the device is being used will affect the supermode interference or coupling, causing the spectrum to shift in wavelength. By detecting changes in this shift in the spectrum, an accurate measurement of the physical parameters of interest can be performed.

The disclosure is a composed MCF device which has higher sensitivity than a single MCF coupler or interferometer. The composed MCF device may be a composed multicore optical fiber interferometer or a composed multicore optical fiber coupler, among other devices. The composed MCF device comprises a first segment (MCF1) of a multicore fiber and a second segment (MCF2) of the same multicore fiber. The multicore fiber has three coupled cores, with one of the three coupled cores is located in the geometrical centre of the multicore fiber. The first segment (MCF1) of the multicore fiber has a first length (L1) and the second segment (MCF1) of the multicore fiber has a second length (L2), the first length (L1) and the second length (L2) being different from each other. The first segment (MCF1) of the multicore fiber and the second segment (MCF2) of the multicore fiber are rotated 180° relative to each other and are fusion spliced together. The first segment (MCF1) of the multicore fiber is fusion spliced to a first segment (SMF1) of a single mode fiber and the second segment (MCF2) of the multicore fiber is spliced to a second segment (SMF2) of the same single mode fiber. The cores located in the geometrical centre of the MCF1 and MCF2, and the unique cores of the SMF1 and SMF2 may be axially aligned. The free end of the second segment (SMF2) of the single mode fiber is coupled to a light reflector or mirror (M) to reflect an optical signal coming from the first segment (SMF1) of the single mode fiber. The light reflector or mirror are devices configured to reflect the light guided through the fiber.

The excitation light may be provided by a broadband optical source that emits within the wavelength range between, for example, 1200 to 1600 nm. Preferably, the broadband optical source might be a LED with peak emission at 1550 nm or a tuneable laser. Light from such a light source may propagate in the first segment (SMF1) of the single mode fiber, the first segment (MCF1) of the multicore fiber, the second segment (MCF2) of the multicore fiber, and the second segment (SMF2) of the single mode fiber until the optical signal reflects from the mirror (M).

In some embodiments, the composed MCF device is configured to operate in reflection mode.

In some embodiments, the three cores of the MCF are equally spaced from each other and are made of the same material. In more preferred embodiments, the three coupled cores of the multicore fiber are made of, for example germanium doped silica, among other materials. The three cores are positioned in the MCF such that they form an equilateral triangle.

In some embodiments, the numerical aperture of the cores of the MCF may be substantially identical to the numerical aperture of the single core of the SMF in order to reduce losses of transmitted light in the zones of union between the SMF and the MCF. For example, the numerical aperture of the cores of the MCF may be 0.14 that is the numerical aperture of standard SMFs.

In some embodiments, the three coupled cores have a diameter of approximately 9 μm and their geometrical centres are separated from each other 11 μm approximately.

In some embodiments, the length (L1) of each one of the first segment (MCF1) of multicore fiber and the length (L2) of the second segment (MCF2) of multicore fiber is preferably less than two centimeters. For example, the length (L1) of the first segment (MCF1) of multicore fiber may be 12.20 millimetres while the length (L2) of the second segment (MCF2) of multicore fiber may be 11.40 millimetres.

In some embodiments, the SMF is a conventional monomode optical fiber.

In some embodiments, the fusion splicing between the two segments of MCF and the two segments of SMF are performed by a fusion splicing machine comprising means for rotating the optical fibers.

The disclosure is a method for constructing a composed MCF device. The composed MCF device constructed by this method may be a composed multicore optical fiber interferometer or a composed multicore optical fiber coupler, among other devices. The method comprises providing a first segment (MCF1) of a multicore fiber that comprises three coupled cores and has a first length (L1). One of the three coupled cores is located in the geometrical centre of the multicore fiber. The method also comprises providing a second segment (MCF2) of the same multicore fiber, this second segment (MCF2) of the multicore fiber having a second length (L2). The first length (L1) and the second length (L2) are different from each other, and preferably, are less than two centimeters. One of the three coupled cores of the multicore fiber is located in the geometrical centre of the multicore fiber. Then, a first segment (SMF1) and a second segment (SMF2) of a single mode fiber are provided. After, the first segment (MCF1) of the multicore fiber, the second segment (MCF2) of the multicore fiber, the first segment (SMF1) of the single mode fiber and the second segment (SMF2) of the single mode fiber are fusion spliced in a serial SMF1-MCF1-MCF2-SMF2 relationship. The cores located in the geometrical centre of the first segment (MCF1) and second segment (MCF2) of the multicore fiber, and the unique cores of the first segment (SMF1) and the second segment (SMF2) of the single mode fiber may be all axially aligned. The first segment (MCF1) of the multicore fiber and the second segment (MCF2) of the multicore are rotated 180° relative to each other and a free end of the second segment (SMF2) of the single mode fiber is coupled to a mirror (M) or light reflector to reflect an optical signal coming from the first segment (SMF1) of the single mode fiber.

The disclosure is a method of using a composed MCF device. The composed MCF device used by this method may be a composed multicore optical fiber interferometer or a composed multicore optical fiber coupler, among other devices. The method comprises proving the composed MCF device as previously defined and inputting a mode, e.g., the fundamental mode of the single mode fiber, propagating in the composed MCF device via the first segment (SMF1) of single mode fiber. Then, several supermodes that propagate in the first segment (MCF1) of the multicore fiber and second segment (MCF2) of the multicore fiber are excited and said supermodes, after propagating in the composed MCF device and reflecting in the mirror, are received in a spectrometer.

In some embodiments, the change of a selected parameter of the external environment is measured by monitoring alterations in a phase or refractive index difference of the supermodes that propagate in the first segment (MCF1) of the multicore fiber and second segment (MCF2) of the multicore fiber.

In some embodiments, a change in spectral response of the received supermodes is detected as a function of a change in a parameter of an external environmental in which the composed MCF device is operationally disposed.

In some embodiments, the selected parameter is at least one parameter selected from a group comprising temperature, pressure, vibrations, strain, bending and any combination thereof. In particular, the selected parameter that is going to be monitored using the composed MCF device may be any parameter whose variations may affect the phase difference between the supermodes that propagate in the first segment (MCF1) and the second segment (MCF2) of the multicore fiber.

The following substantial advantages over prior art interferometers and couplers are among those achieved with the composed MCF device and the methods of constructing and using said composed MCF device herein described: the composed MCF device provides a simple output spectrum pattern which results from the multiplication of the output patterns, e.g., two interference output patterns, of two MCF devices of lengths L1 and L2, respectively; the analysis of the resulting spectrum is simple as it has a well-defined maximum; the measuring range of the composed MCF device is wide; and the sensitivity of the composed MCF device is amplified and higher than that of a single device. It also provides a simple and efficient design.

BRIEF DESCRIPTION OF THE DRAWINGS

To complete the description and in order to provide for a better understanding of the disclosure, a set of drawings is provided. Said drawings form an integral part of the description and illustrate an embodiment of the disclosure, which should not be interpreted as restricting the scope of the disclosure, but just as an example of how the disclosure can be carried out.

The drawings comprise the following figures.

DETAILED DESCRIPTION OF THE DRAWINGS

Figure 1:
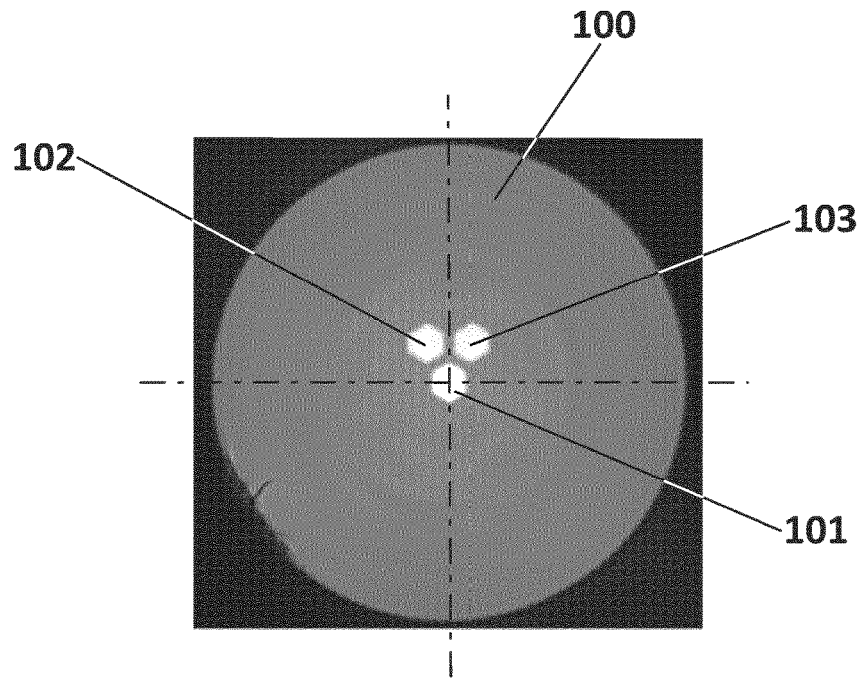
FIG. 1 shows a sectional view of an example multicore optical fiber (MCF) used to fabricate the composed MCF device.

FIG. 1 shows a sectional view an example MCF 100 used to fabricate the composed MCF device. The MCF 100 has three coupled and equally spaced cores 101-103 that form an equilateral triangle. One of the coupled cores 101 is located in the geometrical centre of the MCF 101. The three cores 101-103 have a substantially hexagonal shape. The three coupled cores 101-103 may be made of germanium doped silica, among other materials, and have a diameter of approximately 9 µm. The geometrical centre of each one of the three coupled cores 101-103 may be separated from each other approximately 11 µm.

Figure 2:
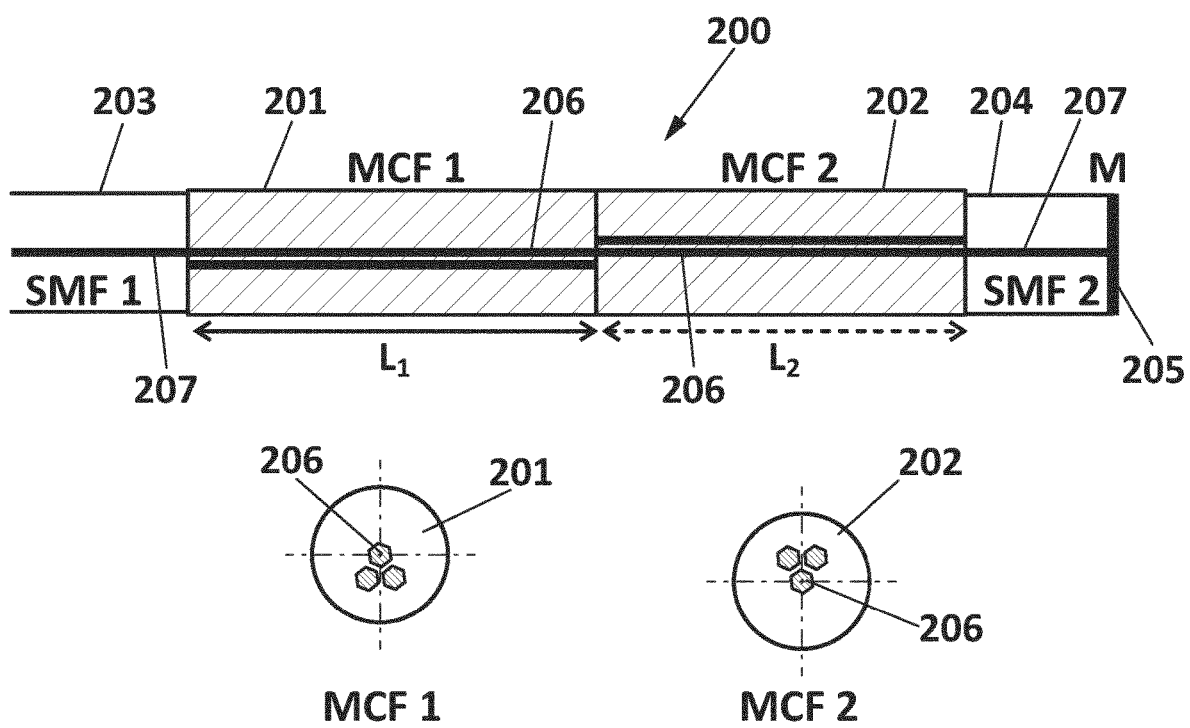
FIG. 2 shows a schematic view of an example composed MCF device in which the two segments of MCF are rotated 180° with respect to each other.

FIG. 2 shows a schematic view of an example composed MCF device 200 in which the two segments of MCF are rotated 180° with respect to each other. The composed MCF device 200 comprises a first segment (MCF1) 201 of the MCF having a first length (L1) and a second segment (MCF2) 202 of the same MCF having a second length (L2), and preferably each one of said lengths (L1, L2) being less than 2 cm. The first length (L1) and the second length (L2) are different from each other. In such example, the first segment (MCF1) 201 of the MCF has a length of 12.20 millimetres while the second segment (MCF2) 202 of the same MCF has a length of 11.40 millimetres.

The first segment (MCF1) 201 of the MCF and the second segment (MCF2) 202 of the MCF are rotated 180° relative to each other and spliced together.

The first segment (MCF1) 201 of the MCF is spliced to a first segment (SMF1) 203 of a SMF and the second segment (MCF2) 202 of the MCF is spliced to a second segment (SMF2) 204 of the same SMF. The SMF is a conventional monomode optical fiber. The free end of the second segment (SMF2) 204 of the SMF is coupled to a mirror (M) 205 to reflect an optical signal coming from the first segment (SMF1) 204 of the SMF. The cores 206 located in the geometrical centre of the first segment (MCF1) 201 and the second segment (MCF2) 202 of the MCF and the unique cores 207 of the first segment (SMF1) 203 and the second segment (SMF2) 204 of the SMF are all axially aligned. The two segments MCF1 201 and MCF2 202 are of the same MCF and the two segments SMF1 and SMF2 are of the same SMF. The numerical aperture of the three cores of the MCF and of the single core of the SMF is substantially the same, e.g., 0.14.

For a better understanding of the functioning of the composed MCF device 200 of FIG. 2, a first analysis of the composed MCF device 200 when L2=0, in other words, when there is no MCF2 202 and the length of MCF1 201 is L1, is carried out. In such case, the composed MCF device 200 becomes an individual MCF device with a SMF1-MCF1-SMF2 structure where the length of MCF1 is L1. Due to the axial symmetry and the fact that the individual MCF device is excited with the fundamental SMF mode, only two supermodes are excited in the MCF1. The supermodes have different effective refractive indices that can be denoted as "n1" and "n2". The accumulated phase difference between the supermodes when they pass the length L1 of MCF1 will be denoted as $\Delta\phi_1 = \sqrt{3}\pi\Delta nL1/\lambda$, where "$\lambda$" is the wavelength of the optical source and $\Delta n = n_1 - n_2$. Thus, the transmission intensity ($I_{1T}$) of the individual SMF1-MCF1-SMF2 structure having one single MCF segment (MCF1) whose length is L1 can be expressed as:

$$I_{1T} = 1 - (2/3)\operatorname{Sin}^2(\Delta\phi_1). \tag{1}$$

Then, a second analysis of the composed MCF device 200 when L1=0, in other words, when there is no MCF1 201 and the length of the MCF2 202 segment is L2, is carried out. In such example, the phase difference will be denoted as $\Delta\phi_2 = \sqrt{3}\pi\Delta nL2/\lambda$, and the transmission intensity of the individual MCF device can also be expressed by Eq. (1), but with $\Delta\phi_2$ instead of $\Delta\phi_1$.

Besides, the analysis of the reflection spectrum of an individual MCF device with one single MCF segment, having a SMF1-MCF1 (or MCF2)-SMF2 structure when the SMF2 at the final extreme has a mirror (M) on its face (see FIG. 2), is carried out. In this case, the structure of the individual MCF device can be considered as two SMF-MCF-SMF structures in series. The transmission spectrum of two of said structures in series is the product of the individual transmissions. Thus, the reflection intensity of a single SMF-MCF-SMF structure with L1 (or L2) is simply $I_{1R} = I_{1T}^2$ (or $I_{2R} = I_{2T}^2$). Then, considering the two SMF-MCF-SMF structures in series and assuming that the length of the MCF segment is L1, "$I_{1R}$" can be expressed as:

$$I_{1R} = [1 - (2/3)\operatorname{Sin}^2(\Delta\phi_1)]^2. \tag{2}$$

In the example of FIG. 2, when the length of MCF1 201 is L1 and the length of MCF2 202 is L2=L1+L0 (or L2=L1−L0), the composed MCF device 200 can be considered as two combined MCF devices with a SMF1-MCF1-MCF2-SMF2 structure in series. In this case, one of the two combined MCF devices will be phase shifted with respect to the other, provided that L0>0. The absolute phase difference between the two combined MCF devices will be $\delta\phi = \sqrt{3}\pi L0\Delta n/\lambda$. To avoid overlapping of the maxima of the individual spectra, "$\delta\phi$" is considered to be less than "$\pi$". Under this condition, the two combined MCF devices will be phase shifted less than a period when:

$$0 < L0 < \lambda/(\sqrt{3}\Delta n). \tag{3}$$

In supermode interference, the expression $\lambda/(\sqrt{3}\Delta n)$ is called the period of the power exchange between the MCF coupled cores [L. Szostkiewicz et al., OL Vol. 41, pp. 3759, 2016]. In [J. Villatoro et al., Art. ThE68, OFS26, 2018], it was demonstrated that for the three cores fiber shown in FIG. 1, such a period, or L0, is 1900 µm approximately.

Under the conditions stated above, the reflection intensity of an individual MCF device having a SMF-MCF-SMF structure with length L2 can be expressed as:

$$I_{2R} = [1 - (2/3)\operatorname{Sin}^2(\Delta\phi_1 + \delta\phi)]^2. \tag{4}$$

For the composed MCF device 200 shown in FIG. 2 in which two segments of MCF of length L1 and L2 are placed in series and that the device is interrogated in reflection mode, the reflection of the composed MCF device 200 can be expressed as:

$$I_R = (I_{1T}^2)(I_{2T}^2). \tag{5}$$

This means, the composed MCF device 200 is equivalent to two MCF devices, with a SMF1-MCF1-MCF2-SMF2 structure and a SMF2-MCF2-MCF1-SMF1 structure, respectively, placed in series.

The sensitivity "S" of a sensing device is defined as the rate of change of the quantity that can be measured (light intensity, shift of the interference pattern, etc.) as a function of the stimulus "X" that is being sensed. Thus, the sensitivity of a single MCF device of length L1 when it operates in transmission mode, is simple: $S_{1T}=\partial I_{1T}/\partial X$. If the length of the device is L2, the sensitivity can be expressed as $S_{2T}=\partial I_{2T}/\partial X$. In the latter expressions, $I_{1T}$ or $I_{2T}$ can be described according to Eq. (1).

The sensitivity $S_R$ of the composed MCF device described in FIG. 2 to a particular stimulus "X" can be calculated by differentiating Eq. (5). Therefore, it is obtained:

$$S_R = M_1 S_{1T} + M_2 S_{2T}. \quad (6)$$

In Eq. (6), $M_1 = 2I_{1T}(I_{2T}^2)$ and $M_2 = 2I_{2T}(I_{1T}^2)$. This means that the sensitivity of the composed MCF device to a particular stimulus "X" is the sum of the amplified sensitivities of the individual device. Thus, the sensitivity of the composed MCF device is higher than the sensitivity of an individual MCF device and even higher than the sensitivity of two individual MCF device placed in series.

The example composed MCF device 200 may be used for measuring changes in any parameter whose variations may affect $\Delta\phi_1$ and/or $\Delta\phi_2$, i.e., the phase difference between the supermodes that propagate in the first segment (MCF1) and the second segment (MCF2) of the multicore fiber. For example, the example composed MCF device 200 may be used for measuring temperature, vibrations, bending, strain, etc., of an object to which the example composed MCF device 200 is coupled to by monitoring alterations in a phase difference of the supermodes that propagate in the first segment (MCF1) of the multicore fiber and second segment (MCF2) of the multicore fiber.

Figure 3:
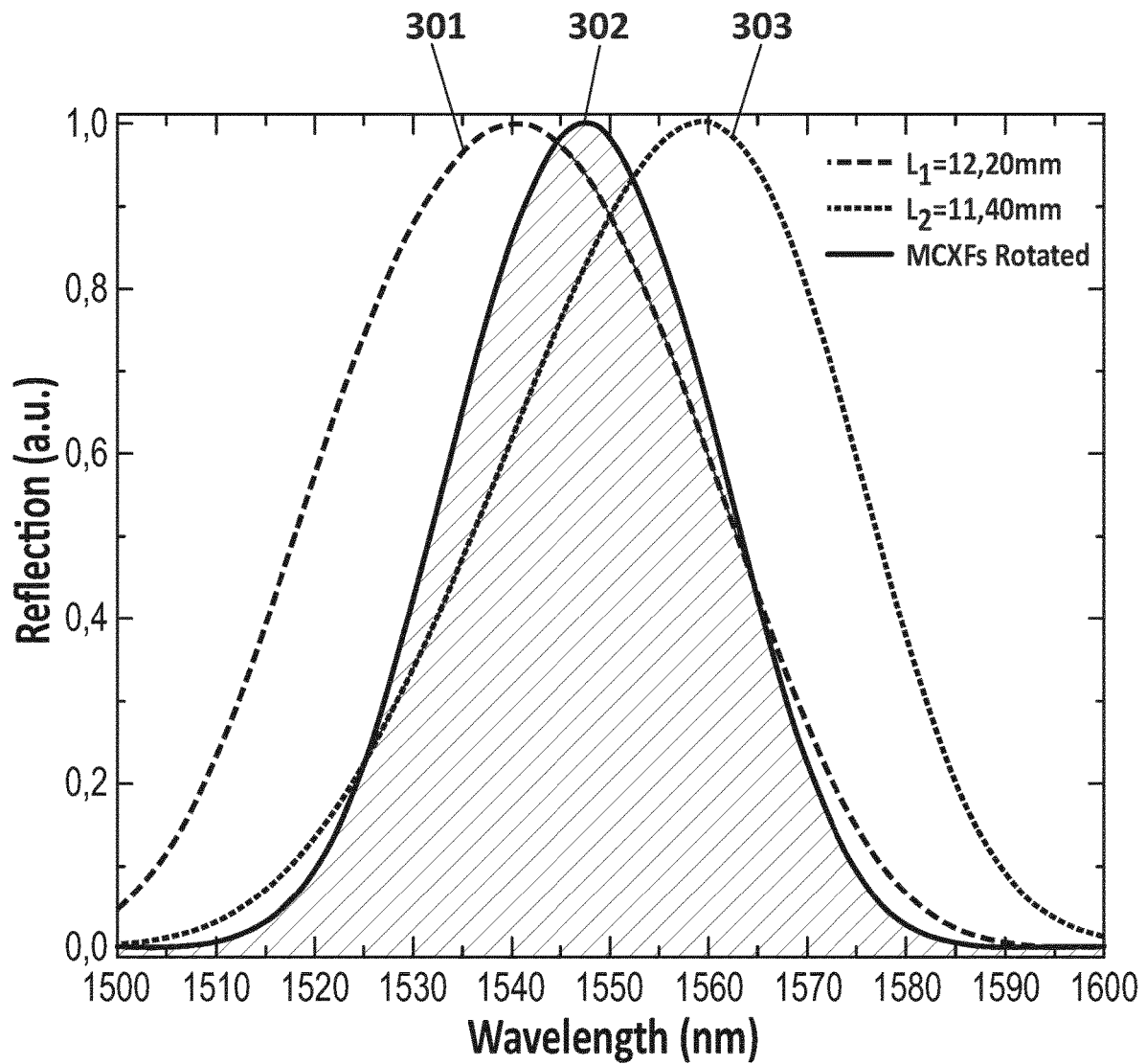
FIG. 3 shows several reflection spectra obtained for two example individual devices with SMF-MCF-SMF structures and for the composed MCF device of FIG. 2.

FIG. 3 shows several reflection spectra 301-303 obtained for two example individual MCF devices with SMF-MCF-SMF structures and for the composed MCF device of FIG. 2.

In particular, the dashed line corresponds to the reflection spectrum 301 of a first example individual MCF device in which L1=12.20 mm and L2=0. Therefore, the structure of the first example MCF device is a SMF1-MCF1-SMF2 structure. The dotted line corresponds to the reflection spectrum 302 of a second example individual MCF device in which L2=11.40 mm and L1=0. Therefore, the structure of the second example MCF device is SMF1-MCF2-SMF2 structure. The shadowed area with solid line corresponds to the reflection spectrum 303 obtained for the composed MCF device of FIG. 2 in which L1=12.20 and L2=11.40 and the two MCF segments were fusion spliced together and rotated 180° with respect to each other. Thus, FIG. 3 shows the normalized reflection spectra 301-303 of MCF devices in three different cases. It should be noted that the spectrum 303 for the composed MCF device is equivalent to that when the spectra 301-302 shown in dotted and dashed lines are multiplied. The spectrum 303 of the composed MCF device exhibits a single and narrow peak. Note that the position in wavelength of such a peak of the spectrum 303 of the composed MCF device is between the maxima of the spectra 301-302 of the individual MCF devices.

The advantages of the composed MCF device as described herein when compared to the individual MCF device (having a SMF-MCF-SMF structure) are, among others, higher sensitivity, as described by Eq. (6), than an individual MCF device and a reflection spectrum that exhibits a single and narrow peak which is easy to track and analyse.

Figure 4:
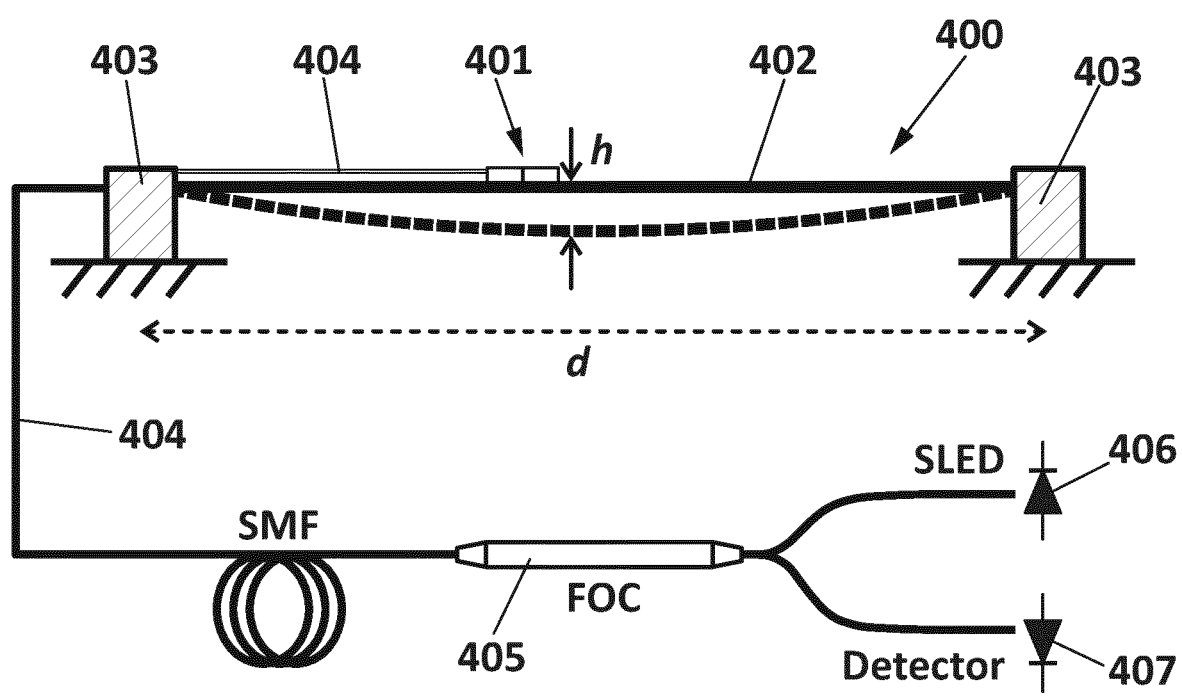
FIG. 4 shows an example set-up for using the example composed MCF device shown in FIG. 2 for measuring curvature or vibrations in an element or surface.

FIG. 4 shows an example set-up 400 for using the example composed MCF device 401 shown in FIG. 2 for measuring curvature or vibrations in an elongated element or surface 402. In such set-up 400 "h" is the bending depth of the element or surface 402 and "d" the fixed distance between the two fixing points or supports 403 the element 402 is coupled to. Although in such example only concave curvature applied to the elongated element or surface 402 is illustrated, any other type of curvature, such as convex curvature or angular curvature, applied to different objects with different geometries may be measured with the example composed MCF device 401.

The composed MCF device 401 described in FIG. 2 is placed on the element 402 at a distance substantially equal between the two supports 403. Therefore, when a bending force is applied to the element 402, this bending force is also applied to the composed MCF device 402. The first segment (SMF1) 404 of the single mode fiber is coupled to a fiber optic coupler (FOC) 405 such that the light generated by the SLED 406 is transmitted to the composed MCF device 401 and the light reflected from the mirror (M) of the composed MCF device 401 is received in the detector 407, for example, a spectrometer. The power distribution transmitted through the FOC 405 depends on the wavelength and polarization of the optical source. Such FOCs can be fabricated in different ways, for example by thermally fusing fibers so that their cores get into intimate contact.

The detector 407 is connected to computing means (not shown in this figure) for monitoring, analysing and representing the generated output spectrum pattern. It should be understood that the example set-up 400 depicted in FIG. 4 may include additional components and that some of the components described herein may be removed and/or modified without departing from a scope of the example set-up 400.

The SLED light emitting diode 406 has its peak emission at 1550 nm.

Figure 5:
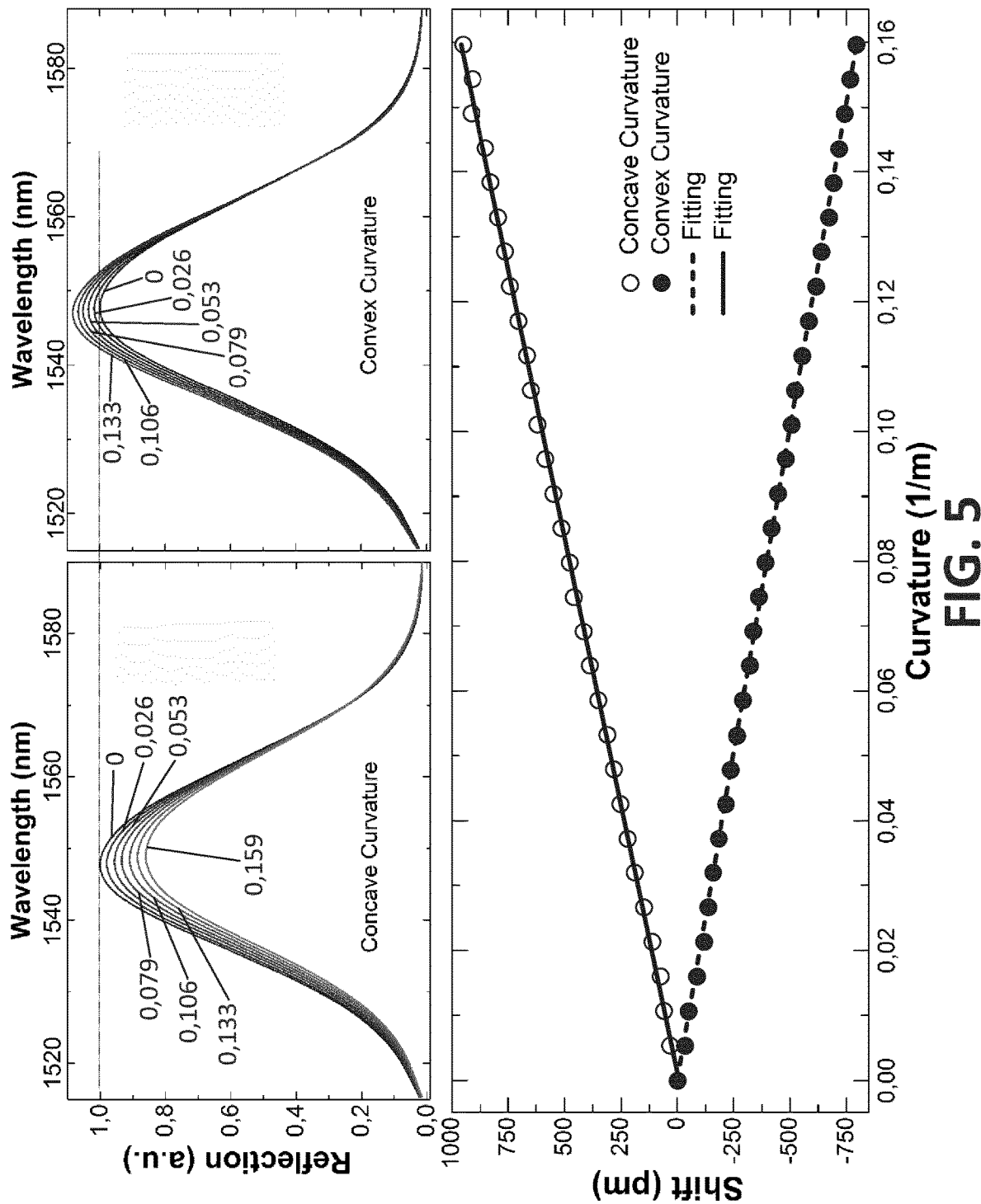
FIG. 5 shows example output spectrum patterns observed for the composed MCF device in the set-up of FIG. 4 when the element or surface is curved downwards (top left) and upwards (top right), and an example (bottom) graph representing the calibration curves for both directions of curvatures.

FIG. 5 shows example output spectrum patterns observed when the composed MCF device 401 in the set-up 400 of FIG. 4 when the element or surface 402 is curved downwards (top left graph) and upwards (top right graph). FIG. 5 also shows an example (bottom) graph representing the calibration curves for both directions of curvatures.

The top left graph summarizes the reflection spectra measured by the composed MCF device 401 as a function of curvature C, which is defined as $C=12h/d^2$, "h" is the deflection of the element or surface 402, and "d" is the separation between the fixing points 403, when a concave curvature is applied to the element or surface 402. It is observed that for a higher "h" a lower reflection is measured by the composed MCF device 401 and vice versa. Said concave curvature applied to element or surface 402 also causes a shift to longer wavelengths of the reflected spectrum.

The top right graph summarizes the reflection measured by the composed MCF device 401 as a function of C, which is defined as $C=12h/d^2$, "h" is the deflection of the element or surface 402, and "d" is the separation between the fixing points 403, when a convex curvature is applied to the element or surface 402. It is also observed that for a higher "h" a higher reflection is measured by the composed MCF device 401 and vice versa. Said convex curvature applied to element or surface 402 causes a shift to shorter wavelengths of the reflected spectrum.

The output spectrum of the composed MCF device described here comprises a single peak whose amplitude or position in wavelength (an absolute parameter) is easy to track and correlate with a parameter to be sensed (measured), for example the deflection of the element in the example of FIGS. 4 and 5. The bottom graph shown in FIG. 5 represents the calibration curves for both directions of curvatures. When there is no curvature, the shift is considered as 0 pm. The points are measured values of curvature and the continuous solid and dashed lines are fitting to the data. It is observed that the composed MCF device provides information of both the magnitude of curvature as well as the orientation of curvature.

The monitored wavelength is the position of the maxima of the plots shown in FIG. 5, in other words, the wavelength position of the peaks shown in the top graphs of FIG. 5 which substantially correspond to the 1550 nm from the SLED 406.

Figure 6:
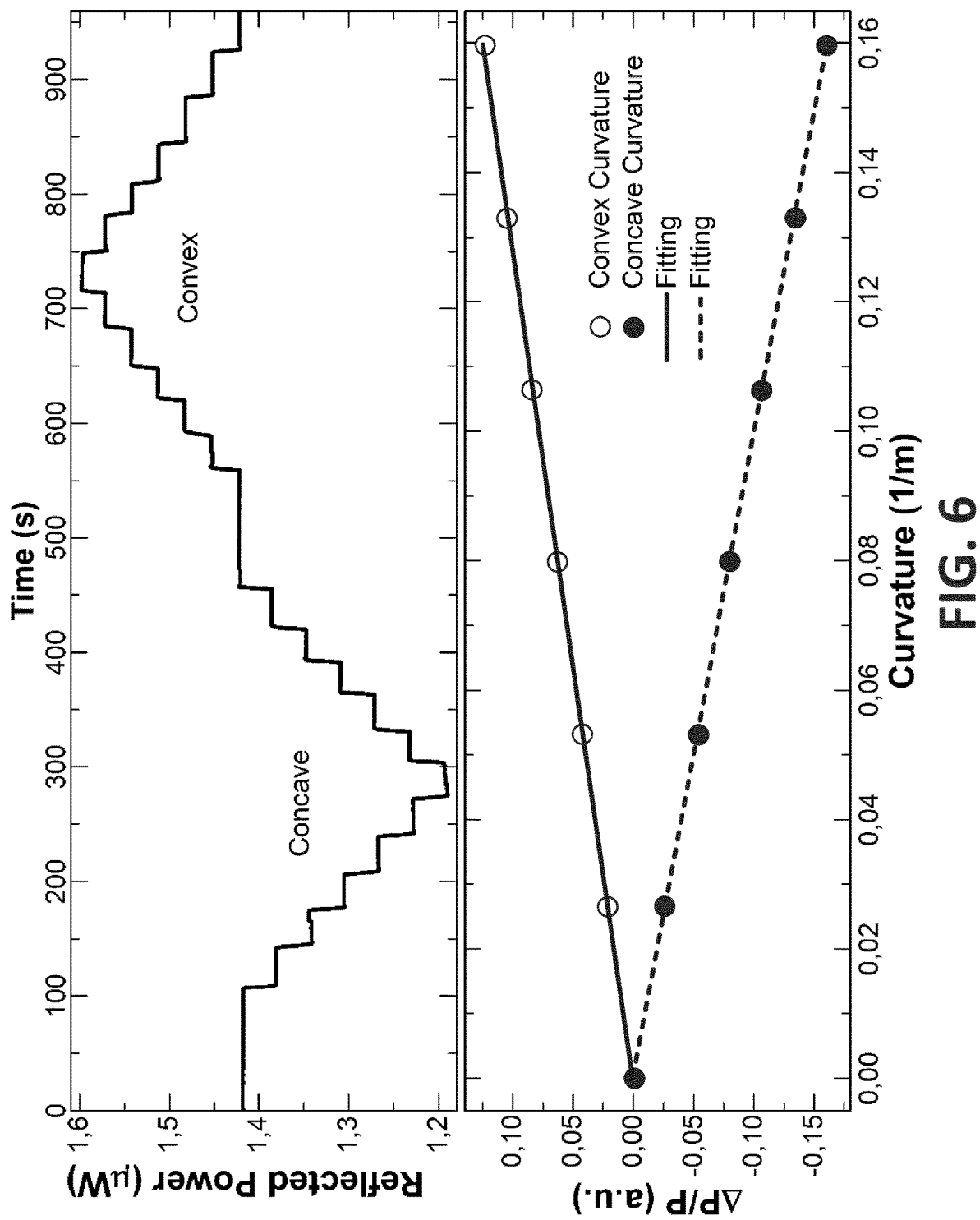
FIG. 6 shows an example (top) graph representing monitored power as a function of time when the composed MCF device is curved downwards and upwards and a (bottom) graph representing the calibration curve for both directions of curvatures.

FIG. 6 shows a plot (top graph) representing the monitored optical power as a function of time when the composed MCF device 401 of FIG. 4 is curved downwards (concave curvature) and upwards (convex curvature). The bottom graph shown in FIG. 6 represents the calibration curve for both directions of curvature. The solid dots are the measured changes of power (ΔP) for different curvature values with respect to the optical power (P) when no curvature is applied on the composed MCF device. The steps in each case were 0.0266 $m^{-1}$, in other words, for value of ΔP/P, the curvature of the element or surface 402 was increased (convex curvature) or decreased (convex curvature) in 0.0266 $m^{-1}$. The monitored wavelength was 1550 nm from the SLED 406.

It can be observed that the composed MCF device provides again information of the magnitude and direction of the curvature.

Figure 7:
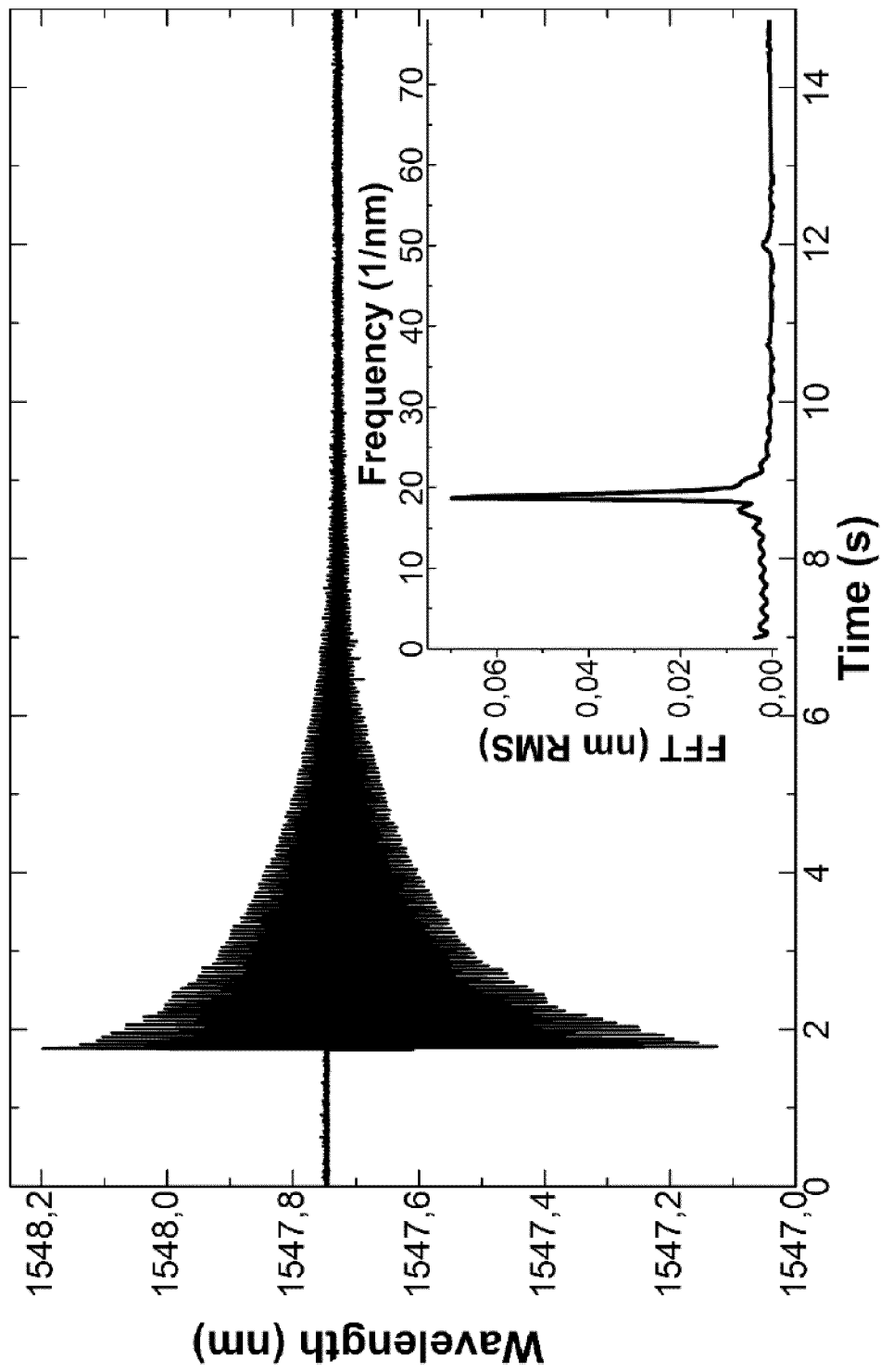
FIG. 7 shows an example graph representing the position in wavelength of the reflection spectrum as a function of time of a vibrating element.

The capability of the composed MCF device to monitor vibrations was demonstrated with the set-up 401 of FIG. 4. A concave curvature was applied to the element 402 and it was allowed to oscillate freely. The position of the peak wavelength of the reflection spectrum of the composed MCF device was monitored as a function of time. The solid line of FIG. 7 shows the position of such peak wavelength versus time. When the element 402 stopped vibrating, the peak wavelength of the reflection spectrum of the composed MCF device returned to the baseline. The inset plot of FIG. 7 shows the fast Fourier transform (FFT) of the wavelength versus time plot. The position of the FFT peak is at 18.67 Hz. This means that by means of the FFT it is possible to know the frequency of oscillation of an element the composed MCF device is attached to.

The composed MCF devices as described herein are sensitive to minute variations of the physical length of the segments of the MCF used to fabricate them. They are also sensitive to changes of refractive index of the modes that are excited in the MCF (including those modes that may participate in the interferences that take place within the MCF) and to bending or vibrations. In either case, the phase difference between the interfering modes (supermodes within the MCF segments) changes and makes the reflected spectrum (e.g., the reflected interference spectrum) to displace, which facilitates tracking any change in the environment of the composed MCF device and correlating said changes with a parameter to be sensed.

The composed MCF device described here is sensitive to curvature and to the direction of curvature as well as to vibrations. These can be considered as examples of the possible parameters that this disclosure can monitor, but there are other parameters that may change the supermodes that propagate in the MCF and change the position or amplitude of the reflected spectrum. The key for sensing of the composed MCF device is to alter the refractive index of the supermodes that are excited in the MCF. For the case in which the composed MCF device is a composed MCF interferometer, the key for sensing of the composed MCF interferometer is to alter the phase difference between the supermodes that particulate in the interference.

In this text, the term "comprises" and its derivations (such as "comprising", etc.) should not be understood in an excluding sense, that is, these terms should not be interpreted as excluding the possibility that what is described and defined may include further elements, steps, etc.

The disclosure is obviously not limited to the specific embodiments described herein, but also encompasses any variations that may be considered by any person skilled in the art (for example, as regards the choice of materials, dimensions, components, configuration, etc.), within the general scope of the disclosure as defined in the claims.

The invention claimed is:

1. A composed multicore optical fiber device, comprising:
   a first segment of a multicore fiber comprising three coupled cores and having a first length, wherein one of the three coupled cores is located in the geometrical centre of the multicore fiber;
   a second segment of the same multicore fiber having a second length, the first length and the second length being different from each other;
   wherein the first segment and the second segment of the multicore fiber are rotated 180° relative to each other and spliced together;
   wherein the first segment of the multicore fiber is spliced to a first segment of a single mode fiber and the second segment of the multicore fiber is spliced to a second segment of the single mode fiber; and
   wherein a free end of the second segment of the single mode fiber is coupled to a light reflector or mirror to reflect a guided light coming from the first segment of the single mode fiber.

2. The composed multicore optical fiber device of claim 1, wherein the composed multicore optical fiber device is configured to operate in reflection mode.

3. The composed multicore optical fiber device of claim 1, wherein the three cores of the multicore fiber are equally spaced from each other and are made of the same material.

4. The composed multicore optical fiber device of claim 3, wherein the three coupled cores of the multicore fiber are made of germanium doped silica.

5. The composed multicore optical fiber device of claim 1, wherein the three coupled cores have a diameter of 9 μm and are separated from each other 11 μm.

6. The composed multicore optical fiber device of claim 1, wherein the length of the first segment of multicore fiber and the length of the second segment of multicore fiber is less than two centimetres.

7. The composed multicore optical fiber device of claim 1, wherein the cores located in the geometrical centre of the first segment of the multicore fiber and the second segment of the multicore fiber, and the unique cores of the first segment of a single mode fiber the second segment of the single mode fiber are all axially aligned.

8. The composed multicore optical fiber device of claim 1, wherein a numerical aperture of the cores of the multicore fiber is substantially the same as a numerical aperture of the core of the single mode fiber.

9. The composed multicore optical fiber device of claim 1, wherein the single mode fiber is a conventional monomode optical fiber.

10. The composed multicore optical fiber device of claim 1, wherein the fusion splicing between the two segments of multicore fiber and the two segments of single mode fibers are performed by a fusion splicing machine that comprises means for rotating the optical fibers.

11. A method of using a composed multicore optical fiber device, the method including the following steps:
- proving the composed multicore optical fiber device according to claim 1;
- inputting a mode propagating in the composed multicore optical fiber device via the first segment of single mode fiber;
- exciting supermodes that propagate in the first segment of the multicore fiber and second segment of the multicore fiber; and
- receiving, in a spectrometer, the supermodes after propagating in the composed multicore optical fiber device and reflecting in the light reflector or mirror.

12. The method of using the composed multicore optical fiber device according to claim 11, including the step of measuring the change of a selected parameter of the external environment by monitoring alterations in a phase or a refractive index difference of the supermodes that propagate in the first segment of the multicore fiber and second segment of the multicore fiber.

13. The method of using the composed multicore optical fiber device according to claim 11, comprising detecting a change in spectral response of the received supermodes as a function of a change in a parameter of an external environmental in which the composed multicore optical fiber device is operationally disposed.

14. The method of using the composed multicore optical fiber device according to claim 11, wherein the selected parameter is at least one from a group comprising temperature, vibrations, pressure, strain, bending and any combination thereof.

15. A method for constructing a composed multicore optical fiber device, the method including the following steps:
- providing a first segment of a multicore fiber that comprises three centred and coupled cores and has a first length, wherein one of the three coupled cores is located in the geometrical centre of the multicore fiber;
- providing a second segment of the same multicore fiber having a second length, the first length and the second length being different from each other;
- providing a first segment and a second segment of a single mode fiber; and
- fusion splicing the first segment of the multicore fiber, the second segment of the multicore fiber, the first segment of the single mode fiber and the second segment of the single mode fiber in a serial SMF1-MCF1-MCF2-SMF2 relationship, wherein the first segment of the multicore fiber and the second segment of the multicore are rotated 180° relative to each other and wherein a free end of the second segment of the single mode fiber is coupled to a light reflector or mirror to reflect an optical signal coming from the first segment of the single mode fiber.

\* \* \* \* \*